(12) United States Patent
Ogawa

(10) Patent No.: US 8,475,916 B2
(45) Date of Patent: Jul. 2, 2013

(54) ANTIREFLECTION FILM AND METHOD FOR MANUFACTURING THE SAME

(75) Inventor: Kazufumi Ogawa, Awa (JP)

(73) Assignee: Empire Technology Development LLC, Wilmington, DE (US)

( * ) Notice: Subject to any disclaimer, the term of this patent is extended or adjusted under 35 U.S.C. 154(b) by 687 days.

(21) Appl. No.: 12/597,743

(22) PCT Filed: Apr. 16, 2008

(86) PCT No.: PCT/JP2008/057425
§ 371 (c)(1),
(2), (4) Date: Oct. 26, 2009

(87) PCT Pub. No.: WO2008/136267
PCT Pub. Date: Nov. 13, 2008

(65) Prior Publication Data
US 2010/0062240 A1    Mar. 11, 2010

(30) Foreign Application Priority Data

Apr. 27, 2007  (JP) .................................. 2007-119581

(51) Int. Cl.
*B32B 17/00*  (2006.01)
*B32B 5/16*  (2006.01)
*B05D 1/18*  (2006.01)

(52) U.S. Cl.
USPC ........................... 428/323; 428/333; 156/62.2

(58) Field of Classification Search
None
See application file for complete search history.

(56) References Cited

U.S. PATENT DOCUMENTS

| | | | |
|---|---|---|---|
| 5,696,629 A | 12/1997 | Berger et al. | |
| 5,747,152 A * | 5/1998 | Oka et al. | 428/323 |
| 5,858,526 A | 1/1999 | Floch et al. | |

FOREIGN PATENT DOCUMENTS

| | | |
|---|---|---|
| JP | H07-300346 | 11/1995 |
| JP | H10-508113 A | 12/1997 |
| JP | H09-500974 A | 1/1999 |
| JP | H11-281802 A | 10/1999 |
| JP | 2003-112379 | 4/2003 |
| JP | 2003-168606 | 6/2003 |
| JP | 2005-017544 A | 1/2005 |
| JP | 2005-182001 | 7/2005 |
| JP | 2006-227419 A | 8/2006 |
| JP | 2006-272588 A | 10/2006 |
| JP | 2006-276384 A | 10/2006 |
| JP | 2007-091870 A | 4/2007 |
| JP | 2007-127847 A | 5/2007 |
| WO | 2006093748 A2 | 9/2006 |
| WO | WO 2008/136267 A1 | 11/2008 |

OTHER PUBLICATIONS

International Search Report for International Patent Application No. PCT/JP2008/057425, mailed Jul. 29, 2008, 4 pages.

International Preliminary Report on Patentability for PCT/JP2008/057425 mailed Nov. 19, 2009 (English translation).

Kursawe, M., et al., "Nano-Particles by Wet Chemical Processing in Commercial Applications," Journal of Sol-Gel Science and Technology, 2005, vol. 33, Issue: 1, pp. 71-74.

Thomas, I., Single-layer TiO2 and multilayer TiO2-SiO2 optical coatings prepared from colloidal suspensions Applied Optics, 1987, vol. 26, Issue: 21, pp. 4688-4691.

Wu, Z., et al., "Deformable Antireflection Coatings from Polymer and Nanoparticle Multilayers," Advanced Materials, 2006, vol. 18, Issue: 20, pp. 2699-2702.

* cited by examiner

*Primary Examiner* — Sheeba Ahmed
(74) *Attorney, Agent, or Firm* — Foley & Lardner LLP

(57) ABSTRACT

An antireflection film that requires neither a special vacuum chamber nor other expensive instruments and can be formed on a substrate of any size, and a method for manufacturing such an antireflection film are provided. The antireflection film is configured as follows: to the surface of a substrate coated with a film composed of a first film compound having a first functional group, is bound and fixed a layer of transparent fine particles through a bond formed by a coupling reaction between the first functional group and a first coupling reactive group of a first coupling agent that forms a film coating each of the transparent fine particles. Furthermore, alternating layers that consist of transparent fine particles each coated with a film composed of a film compound reactive with the first coupling reactive group and the reactive transparent fine particles may be bound and fixed thereonto.

23 Claims, 5 Drawing Sheets

(A)

(B)

IN THIS DRAWING, ◐ AND ◓ REPRESENT $\underset{\underset{}{}}{\overset{}{N}}\!\!\diagdown\!\!N-CH_2-\underset{OH}{CH}-$ AND $-HC-H_2C-\overset{+}{N}\diagup\!\!\overset{}{N}-CH_2-\underset{OH}{CH}-$, RESPECTIVELY.

(A)

(B)

ANTIREFLECTION FILM AND METHOD FOR MANUFACTURING THE SAME

TECHNICAL FIELD

The present invention relates to an antireflection film for optical components or the like, in particular, an antireflection film produced by fixing a transparent fine particle layer containing translucent fine particles to the surface of a substrate via covalent bonds, and a method for manufacturing such an antireflection film.

BACKGROUND ART

The surface of a translucent component used for various products has an antireflection film having high light transmission and low reflectance. Such an antireflection film is manufactured for a wide variety of purposes, for example, prevention of a mirroring effect due to surface reflection in front screens of automobiles, glass for buildings, and panels for displays, prevention of multiple interferences in lenses for cameras and glasses, and improvement of photoelectric conversion efficiency by reducing reflectance.

Various antireflection films have been proposed to date, and from the perspective of antireflection performance, multilayer interference films (see Patent Documents 1 and 2, etc.) and porous films (see Patent Documents 3 and 4, etc.) are generally considered to be favorable.

[Patent Document 1] Japanese Unexamined Patent Application Publication No. 2005-017544
[Patent Document 2] Japanese Unexamined Patent Application Publication (Translation of PCT Application) No. H10-508113
[Patent Document 3] Japanese Unexamined Patent Application Publication No. H7-300346
[Patent Document 4] Japanese Unexamined Patent Application Publication No. H11-281802

DISCLOSURE OF INVENTION

Problems to be Solved by the Invention

However, the multilayer interference films disclosed in Patent Documents 1 and 2 have problems of difficulty in controlling the film thickness and a high manufacturing cost. In particular, the antireflection film disclosed in Patent Document 1 is formed using a vacuum deposition method and thus necessitates expensive vacuum equipment for manufacturing and, furthermore, cannot be easily formed on a large substrate so as to have a uniform thickness.

Also, in the porous films disclosed in Patent Documents 3 and 4, it is difficult to control the film thickness and the pore size strictly.

The present invention was made to address these problems and intended to provide an antireflection film whose film thickness, pore size, and refractive index can be easily controlled and a method for manufacturing such an antireflection film.

Means for Solving the Problems

An antireflection film according to the first aspect of the present invention and meeting the objective described above is an antireflection film including a substrate coated with a film composed of a first film compound having a first functional group and a transparent fine particle layer formed of arranged transparent fine particles each coated with a film composed of a second film compound having a second functional group, wherein the coated transparent fine particle is bound and fixed to the surface of the coated substrate via bonds formed by coupling reactions between the first and second functional groups and a coupling agent having at least one first coupling reactive group that forms a bond through a coupling reaction with the first functional group and at least one second coupling reactive group that forms a bond through a coupling reaction with the second functional group.

It should be noted that the "coupling reaction" means any reaction initiated by an addition reaction or a condensation reaction between functional groups and may be a thermal reaction or a photoreaction.

In the antireflection film according to the first aspect of the present invention, the first film compound and the second film compound are preferably the same compound.

In the antireflection film according to the first aspect of the present invention, the film composed of the first film compound and/or the film composed of the second film compound is preferably a monomolecular film.

An antireflection film according to the second aspect of the present invention is an antireflection film including a substrate coated with a film composed of a first film compound having a first functional group and a plurality of transparent fine particle layers each formed of arranged transparent fine particles, wherein the transparent fine particle layers are sequentially layered in order on a surface of the coated substrate from the first to the n-th layers (n represents an integer equal to or greater than 2) in the direction from the coated substrate side toward the are interface side, the surface of each transparent fine particle forming the x-th transparent fine particle layer (x is an integer; $1 \leq m \leq n$) is coated with a film composed of an m-th film compound having an (x+1)-th functional group, and the (x−1)-th and x-th transparent fine particle layers are fixed to each other via bonds formed by: a coupling reaction between an x-th functional group and an x-th coupling reactive group of an x-th coupling agent having at least one x-th coupling reactive group that forms a bond through a coupling reaction with the x-th functional group and at least one (x+1)-th coupling reactive group that forms a bond through a coupling reaction with the (x−1)-th functional group; and a coupling reaction between the (x+1)-th functional group and the (x+1)-th coupling reactive group.

In the antireflection film according to the second aspect of the present invention, it is preferable that the first to (n+1)-th film compounds are the same compound and the first to n-th coupling agents are the same compound.

In the antireflection film according to the second aspect of the present invention, the films respectively composed of the first to (n+1)-th film compounds are preferably all monomolecular films.

In the antireflection films according to the first and second aspects of the present invention, each of the bonds formed by the coupling reactions may be an N—$CH_2CH(OH)$ bond formed by a reaction between an amino or imino group and an epoxy group.

In the antireflection film according to the second aspect of the present invention, each of the bonds formed by the coupling reactions may be an NH—CONH bond formed by a reaction between an amino or imino group and an isocyanate group.

A method for manufacturing an antireflection film according to the third aspect of the present invention is a method for manufacturing an antireflection film containing a substrate coated with a film composed of a first film compound having a first functional group and a first bonding group at each end thereof, and a transparent fine particle layer formed of arranged transparent fine particles each coated with a film composed of a second film compound having a second functional group and a second bonding group at each end thereof, including a step A of bringing a solution comprising the first film compound into contact with the surface of the substrate to form a bond between the first bonding group and the surface of the substrate to thereby prepare a coated substrate having the surface coated with a film composed of the first film compound; a step B of bringing a solution comprising the second film compound into contact with the surface of the transparent fine particle to form a bond between the second bonding group and the surface of the first transparent fine particle to thereby prepare a first coated transparent fine particle having the surface coated with a film composed of the second film compound; and a step C of bringing a first coupling agent having at least one first coupling reactive group that forms a bond through a coupling reaction with the first functional group and at least one second coupling reactive group that forms a bond through a coupling reaction with the second functional group is brought into contact with the surface of the coated substrate and that of each first coated transparent fine particle to form bonds through coupling reactions between the first functional group and the first coupling reactive group and between the second functional group and the second coupling reactive group to thereby bind and fix one transparent fine particle layer composed of the first coated transparent fine particles to the surface of the coated substrate, followed by removing the first coated transparent fine particles that remain unfixed.

In the step C of the method for manufacturing an antireflection film according to the third aspect of the present invention, it is acceptable that the first coupling agent is first brought into contact with the surface of the coated substrate to prepare a reactive substrate coated with a film composed of the first coupling agent and then the first coated transparent fine particles are brought into contact with and fixed to the surface of the reactive substrate.

In the step C of the method for manufacturing an antireflection film according to the third aspect of the present invention, it is acceptable that the first coupling agent is first brought into contact with the surface of each first coated transparent fine particle to prepare first reactive transparent fine particles each coated with a film composed of the first coupling agent and then the surface of the first reactive transparent fine particles are brought into contact with and fixed to the surface of the coated substrate.

In the method for manufacturing an antireflection film according to the third aspect of the present invention, the first film compound and the second compound are preferably the same compound.

In the steps A and B of the method for manufacturing an antireflection film according to the third aspect of the present invention, it is preferable that the first and second film compounds that remain unreacted are washed away and the film formed of the first film compound on the surface of the coated substrate and the film formed of the second film compound on the surface of each first transparent fine particle are monomolecular films.

The method for manufacturing an antireflection film according to the third aspect of the present invention may be also a method for manufacturing an antireflection film having a plurality of transparent fine particle layers which are sequentially layered in order on the substrate from the first layer to the n-th layer (n represents an integer equal to or greater than 2) in a direction from the substrate side toward an air interface side, further including a step D of bringing a solution comprising a third film compound having a third functional group and a third bonding group at each end thereof into contact with the surface of the transparent fine particle to form a bond between the third bonding group and the surface of the transparent fine particle and thereby to coat the second coated transparent fine particle with a film composed of the third film compound, and then bringing a second coupling agent having the second coupling reactive group and at least one third coupling reactive group that forms a bond through a coupling reaction with the third functional group into contact with the surface of the second coated transparent fine particle to prepare the second reactive transparent fine particle having the surface thereof coated with a film composed of the second coupling agent that is fixed to the second coated transparent fine particle via a bond formed by a coupling reaction between the third functional group and the third coupling reactive group; a step E of bringing the second reactive transparent fine particle into contact with the surface of the transparent fine particle layer composed of the first coated transparent fine particles to form a bond through a coupling reaction between the second functional group and the second coupling reactive group, thereby to bind and fix the second reactive transparent fine particle to the surface of the transparent fine particle layer composed of the first coated transparent fine particles, followed by removing the second reactive transparent fine particles that remain unfixed; a step F of bringing the first coated transparent fine particle into contact with the surface of the transparent fine particle layer composed of the second reactive transparent fine particles to form a bond through a coupling reaction between the second functional group and the second coupling reactive group, thereby to bind and fix the first coated transparent fine particle to the transparent fine particle layer composed of the second reactive transparent fine particles, followed by removing the first coated transparent fine particles that remain unfixed; and a step G of repeating the steps E and F in this order to produce an antireflection film comprising n transparent fine particle layers.

It should be noted that, in the step G, the final step may be the step E or F depending on the value of n.

The method for manufacturing an antireflection film according to the third aspect of the present invention may be also a method for manufacturing an antireflection film having a plurality of transparent fine particle layers which are sequentially layered in order on the substrate from the first layer to the n-th layer (n represents an integer equal to or greater than 2) in a direction from the substrate side toward an air interface side, further including the step D of bringing a solution comprising the third film compound into contact with the surface of the transparent fine particle to form a bond between the third bonding group and the surface of the transparent fine particle, to thereby prepare a second coated transparent fine particle that is the transparent fine particle the surface of which is coated with a film composed of the third film compound; the step E of bringing the second coated transparent fine particle into contact with the surface of the transparent fine particle layer composed of the first reactive transparent fine particles to form a bond through a coupling reaction between the third functional group and the first coupling reactive group, to thereby bind and fix the second coated transparent fine particle to the transparent fine particle layer composed of the first reactive transparent fine particles, followed by removing the second coated transparent fine particles that remain unfixed; the step F of bringing the first reactive transparent fine particle into contact with the surface of the transparent fine particle layer composed of the second coated transparent fine particles to form a bond through a coupling reaction between the third functional group and the first coupling reactive group, to thereby bind and fix the first reactive transparent fine particle to the transparent fine particle layer composed of the second coated transparent fine particles, followed by removing the first reactive transparent fine particles that remain unfixed; and the step G of repeating the step E and F in this order to produce an antireflection film containing n transparent fine particle layers.

It should be noted that, in the step G, the final step may be the step E or F depending on the value of n.

In the method for manufacturing an antireflection film according to the third aspect of the present invention, the first to third film compounds are preferably the same compound.

In the step D of the method for manufacturing an antireflection film according to the third aspect of the present invention, it is preferable that an third film compound that remains unreacted is washed away and the film formed of the third film compound on the surface of each second coated transparent fine particle is a monomolecular film.

In the method for manufacturing an antireflection film according to the third aspect of the present invention, it is acceptable that the first and second film compounds or the first to third film compounds are all alkoxysilane compounds and each of the solutions respectively containing the first and second film compounds or the first to third film compounds further contain at least one compound selected from the group consisting of metal carboxylate salts, metal carboxylate esters, polymers based on a metal carboxylate salt, chelates based on a metal carboxylate salt, titanate esters, and chelates based on a titanate ester.

In the method for manufacturing an antireflection film according to the third aspect of the present invention, it is acceptable that the first and second film compounds or the first to third film compounds are all alkoxysilane compounds and each of the solutions respectively containing the first and second film compounds or the first to third film compounds further contain at least one compound selected from the group consisting of ketimine compounds, organic acids, aldimine compounds, enamine compounds, oxazolidine compounds, and aminoalkylalkoxysilane compounds.

In the method for manufacturing an antireflection film according to the third aspect of the present invention, each of the bonds formed by the coupling reactions may be an N—$CH_2CH(OH)$ bond formed by a reaction between an amino or imino group and an epoxy group.

In the method for manufacturing an antireflection film according to the third aspect of the present invention, each of the bonds formed by the coupling reactions may be an NH—CONH bond formed by a reaction between an amino or imino group and an isocyanate group.

Advantages

In the antireflection films according to Claims 1 to 8 and the methods for manufacturing an antireflection film according to Claims 9 to 23, provide an antireflection film that can be used in front screens of automobiles, glass for buildings, panels for displays, lenses for cameras and glasses, panels for solar battery, and other various products, and the methods for manufacturing an antireflection film that requires neither a special vacuum chamber nor a high temperature, and applicable to a large substrate at low cost.

Additionally, the surface of the substrate used in the present invention has a transparent fine particle layer, which is formed of arranged transparent fine particles, bound and fixed thereto, and thus the resulting antireflection film has improved resistance against peeling.

Furthermore, the thickness of the entire antireflection film can be easily controlled by layering antireflection films one-by-one via bonds formed by coupling reactions.

In the antireflection film according to Claim 2, the first and second film compounds are the same compound, and thus can be manufactured at a lower cost.

In the antireflection film according to Claim 3, the film composed of the first film compound and/or the film composed of the second film compound is a monomolecular film, and thus the intrinsic characteristics and functions of the substrate and/or fine particles are maintained.

In the antireflection film according to Claim 4, the transparent fine particle layers layered in the direction from the substrate side the air interface side can be freely configured in terms of the number of the layers, materials and diameters of fine particles constituting the individual layers, and other parameters, and thus the characteristics of the resulting antireflection film, such as the thickness, refractive index, and porosity, can be easily controlled. Furthermore, compounds ideal for the materials of fine particles constituting the individual transparent fine particle layers can be used as the film compounds and coupling agents.

In the antireflection film according to Claim 5, the first to (n+1)-th film compounds are the same compound, and the first to n-th coupling agents are the same compound, and thus can be manufactured at a lower cost.

In the antireflection film according to Claim 6, the films respectively composed of the first to (n+1)-th film compounds are all monomolecular films, and thus the intrinsic characteristics and functions of the substrate and fine particles are maintained.

In the antireflection film according to Claim 7, each of the bonds formed by the coupling reactions is an N—$CH_2CH(OH)$ bond formed by a reaction between an amino or imino group and an epoxy group, and thus would become stronger when heated.

In the antireflection film according to Claim 8, each of the bonds formed by the coupling reactions is an NH—CONH bond formed by a reaction between an amino or imino group and an isocyanate group, and thus would become stronger when heated.

In the method for manufacturing an antireflection film according to Claim 10, a reactive substrate coated with a first coupling agent is first prepared in the step C by bringing the first coupling agent into contact with the surface of a coated substrate. This enables binding and fixing the first coated transparent fine particles to the surface of the coated substrate by coupling reaction between the second functional group and the second coupling reactive group without a pretreatment of the first coated transparent fine particles.

In the method for manufacturing an antireflection film according to Claim 11, first reactive transparent fine particles each coated with a first coupling agent is first prepared in the step C by bringing the first coupling agent into contact with the surface of each first coated fine particle. This enables binding and fixing the first reactive transparent fine particles to the surface of the coated substrate by coupling reaction between the first functional group and the first coupling reactive group without pretreatment of the coated substrate.

In the method for manufacturing an antireflection film according to Claim 12, the first and second film compounds are the same compounds, and thus can be implemented at a lower cost.

In the method for manufacturing an antireflection film according to Claim 13, the films respectively composed of the first and second film compounds are monomolecular films, and thus the intrinsic characteristics and functions of the substrate and fine particles are maintained.

In the method for manufacturing an antireflection film according to Claim 14, the thickness of the resulting antireflection film can be freely controlled using three film compounds and two coupling agents.

In the method for manufacturing an antireflection film according to Claim 15, the thickness of the resulting antireflection film can be freely controlled using three film compounds and one coupling agent. This contributes to the reduction of manufacturing cost.

In the method for manufacturing an antireflection film according to Claim 16, the first to third film compounds and the first and second coupling agents, respectively, are the same compound, and thus can be implemented at a significantly reduced cost.

In the method for manufacturing an antireflection film according to Claim 17, the films respectively composed of the first to third film compounds are monomolecular films, and thus the intrinsic characteristics and functions of the substrate and fine particles are maintained.

In the methods for manufacturing an antireflection film according to Claims 18 and 20, the solution containing a film compound having an alkoxysilyl group further contains at least one compound selected from the group consisting of metal carboxylate salts, metal carboxylate esters, polymers based on a metal carboxylate salt, chelates based on a metal carboxylate salt, titanate esters, and chelates based on a titanate ester as a catalyst for a condensation reaction between the alkoxysilyl group and a hydroxy group. As a result, the time required for preparation of the reactive transparent fine particles is shortened, thereby making manufacturing of antireflection films more efficient.

In the methods for manufacturing an antireflection film according to Claims 19 and 21, the solution containing a film compound having an alkoxysilyl group further contains at least one compound selected from the group consisting of ketimine compounds, organic acids, aldimine compounds, enamine compounds, oxazolidine compounds, and aminoalkylalkoxysilane compounds as a catalyst for a condensation reaction between the alkoxysilyl group and a hydroxy group. As a result, the time required for preparation of the reactive transparent fine particles is shortened, thereby making manufacturing of antireflection films more efficient.

In particular, any of these compounds used in combination with one or more compounds selected from the group consisting of metal carboxylate salts, metal carboxylate esters, polymers based on a metal carboxylate salt, chelates based on a metal carboxylate salt, titanate esters, and chelates based on a titanate ester would act as a promoter and further shorten the preparation time.

In the method for manufacturing an antireflection film according to Claims 22, each of the bonds formed by the coupling reactions is an N—$CH_2CH(OH)$ bond formed by a reaction between an amino or imino group and an epoxy group, and thus would become stronger when heated.

In the method for manufacturing an antireflection film according to Claims 23, each of the bonds formed by the coupling reactions is an NH—CONH bond formed by a reaction between an amino or imino group and an isocyanate group, and thus would become stronger when heated.

BRIEF DESCRIPTION OF THE DRAWINGS

FIG. 1A is an explanatory diagram schematically showing the cross-sectional structure of an antireflection film according to the first embodiment of the present invention, whereas FIG. 1B is that of an antireflection film according to the second embodiment of the present invention.

FIG. 2A represents the cross-sectional structure of the optical glass substrate before the reaction, whereas FIG. 2B represents that of the glass substrate on which a monomolecular film composed of a film compound having an epoxy group is formed.

FIG. 3A represents the cross-sectional structure of one of the silica fine particles before the reaction, whereas FIG. 3B represents that of one of the silica fine particles on which a monomolecular film composed of a film compound having an epoxy group is formed.

BEST MODE FOR CARRYING OUT THE INVENTION

Embodiments of the present invention are described below with reference to the drawings for more understanding thereof.

Figure 1:
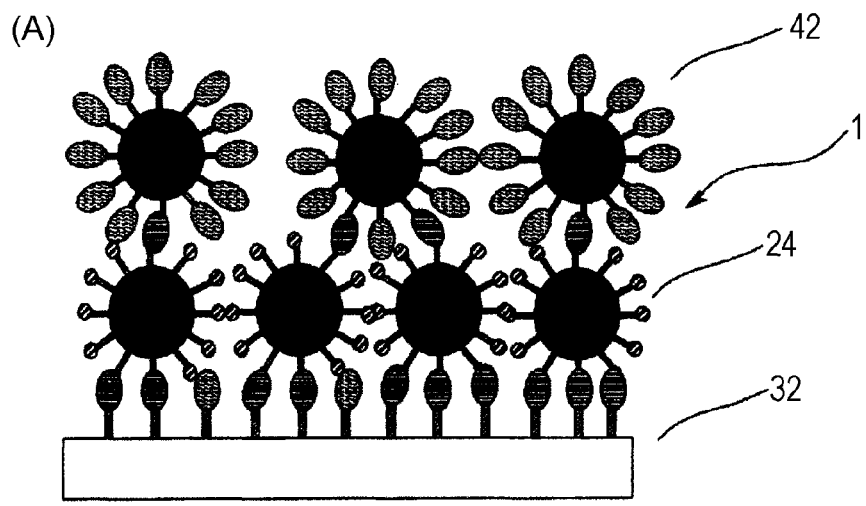
Figure 1:
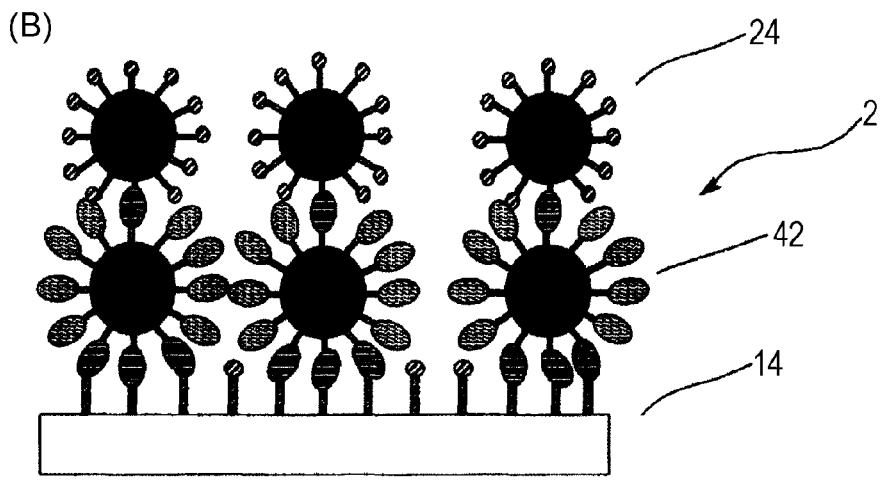
Figure 2:
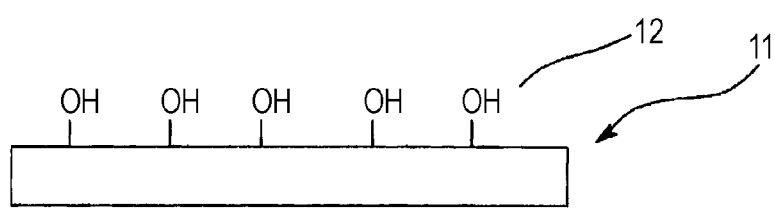
FIG. 2 are enlarged schematic diagrams each illustrating the step of preparing an epoxidized optical glass substrate in a method for manufacturing an antireflection film according to the first and second embodiments of the present invention at the molecular level.
Figure 2:
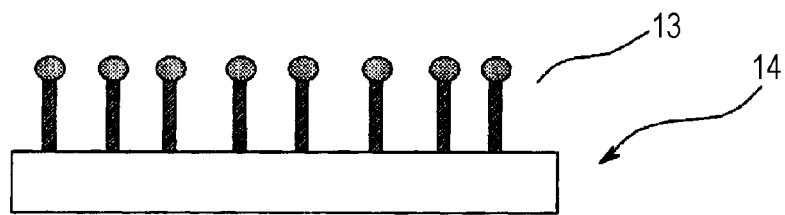
Figure 2:
Figure 3:
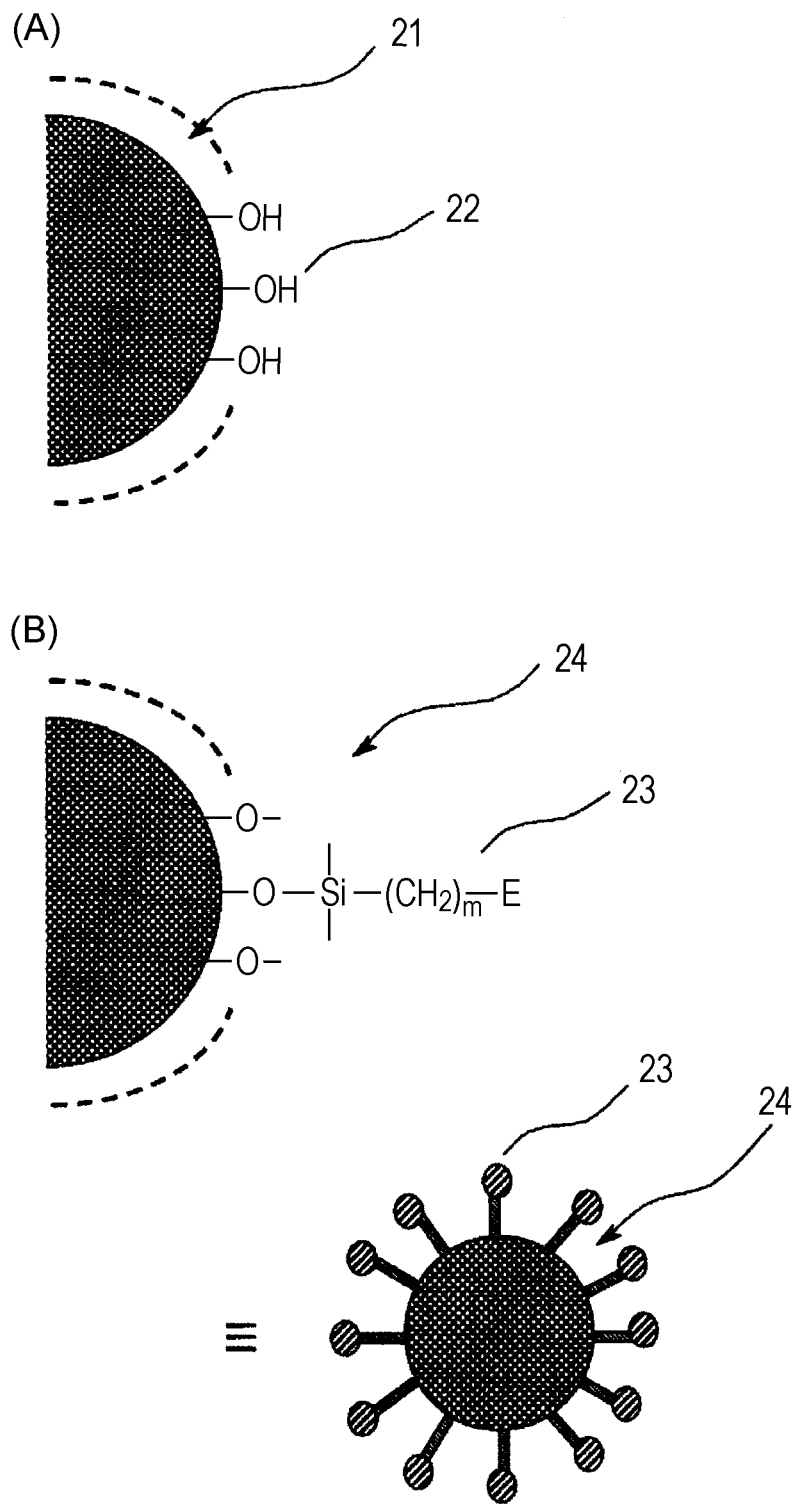
FIG. 3 are enlarged schematic diagrams each illustrating the step of preparing epoxidized silica fine particles in a method for manufacturing the antireflection film mentioned above at the molecular level.
Figure 4:
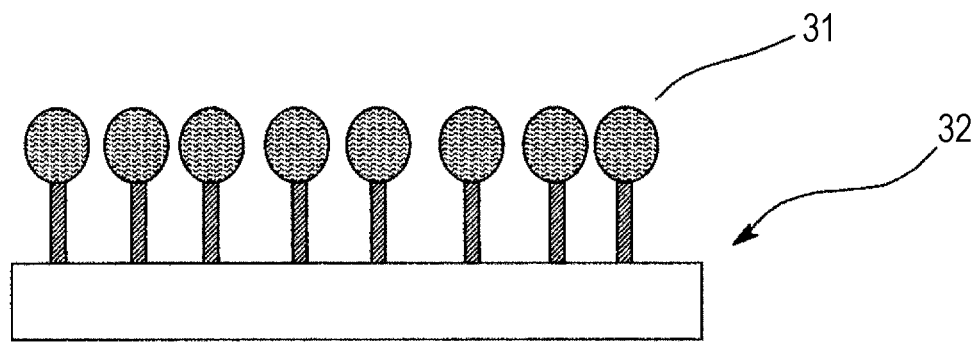
FIG. 4 is an explanatory diagram schematically showing the cross-sectional structure of a reactive optical glass substrate prepared by coating the surface of an epoxidized optical glass substrate with a film composed of 2-methylimidazole, which is fixed to the surface of the epoxidized optical glass substrate via a bond formed by a coupling reaction between the epoxy group and the amino group of 2-methylimidazole.
Figure 5:
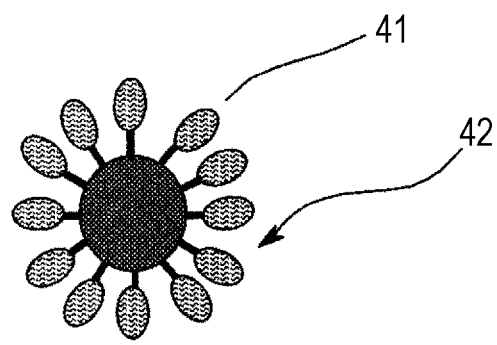
FIG. 5 is an explanatory diagram schematically showing the cross-sectional structure of one of reactive silica fine particles prepared by coating the surface of each epoxidized silica fine particle with a film composed of 2-methylimidazole, which is fixed to the surface of the epoxidized silica fine particle via a bond formed by a coupling reaction between an epoxy group and the amino group of 2-methylimidazole.

In the following description, FIG. 1A is an explanatory diagram schematically showing the cross-sectional structure of an antireflection film according to the first embodiment of the present invention, whereas FIG. 1B is that of an antireflection film according to the second embodiment of the present invention; FIG. 2 are enlarged schematic diagrams each illustrating the step of preparing an epoxidized optical glass substrate in a method for manufacturing an antireflection film according to the first and second embodiments of the present invention at the molecular level, and FIG. 2A represents the cross-sectional structure of the optical glass substrate before the reaction, whereas FIG. 2B represents that of the glass substrate on which a monomolecular film composed of a film compound having an epoxy group is formed; FIG. 3 are enlarged schematic diagrams each illustrating the step of preparing epoxidized silica fine particles in a method for manufacturing the antireflection film mentioned above at the molecular level, and FIG. 3A represents the cross-sectional structure of one of the silica fine particles before the reaction, whereas FIG. 3B represents that of one of the silica fine particles on which a monomolecular film composed of a film compound having an epoxy group is formed; FIG. 4 is an explanatory diagram schematically showing the cross-sectional structure of a reactive optical glass substrate prepared by coating the surface of an epoxidized optical glass substrate with a film composed of 2-methylimidazole, which is fixed to the surface of the epoxidized optical glass substrate via a bond formed by a coupling reaction between the epoxy group and the amino group of 2-methylimidazole; and FIG. 5 is an explanatory diagram schematically showing the cross-sectional structure of one of reactive silica fine particles prepared by coating the surface of an epoxidized silica fine particle with a film composed of 2-methylimidazole, which is fixed to the surface of the epoxidized silica fine particle via a bond formed by a coupling reaction between the epoxy group and the amino group of 2-methylimidazole.

Next, an antireflection film 1 according to the first embodiment of the present invention is described.

As shown in FIG. 1A, the antireflection film 1 is configured as follows: a transparent fine particle layer formed as an array of epoxidized silica fine particles 24 (an example of the first coated transparent fine particles) is bound and fixed to the surface of a reactive optical glass substrate 32 (an example of the reactive substrate); and the first to n-th layers of the transparent fine particle layers (n represents an integer equal to or greater than 2, and is 2 in this embodiment) are layered in the direction from the surface of an epoxidized optical glass substrate 14 toward the air interface.

The surface of the reactive optical glass substrate 32 is coated with a monomolecular film 13 composed of a film compound having an epoxy group (an example of the first film compound), and the surface of the monomolecular film 13 is coated with a film composed of 2-methylimidazole (an example of the first coupling agent), which is fixed via a bond formed by a coupling reaction between the amino group (an example of the first coupling reactive group) of 2-methylimidazole and an epoxy group.

The surface of each epoxidized silica fine particle 24 forming the second transparent fine particle layer is coated with a film composed of 2-methylimidazole (an example of the third coupling agent), which is fixed via a bond formed by a coupling reaction between the amino group (an example of the third coupling reactive group) of 2-methylimidazole and an epoxy group.

The reactive optical glass substrate 32 and the epoxidized silica fine particles 24 forming the first transparent fine particle layer are bound and fixed to each other via bonds formed by coupling reactions between an epoxy group and an amino or imino group of 2-methylimidazole. The epoxidized silica fine particles 24 forming an odd-numbered transparent fine particle layer and the reactive silica fine particles forming the second transparent fine particle layer are also bound and fixed to each other in the same manner.

As shown in FIGS. 2A, 2B, 3A, 3B, 4, and 5, a method for manufacturing the antireflection film 1 includes the step A of preparing an epoxidized optical glass substrate 14 (an example of the coated substrate), in which a solution containing an alkoxysilane compound having an epoxy group (an example of the first film compound) is brought into contact with the surface of an optical glass substrate 11 (an example of the substrate) to form a bond between an alkoxysilyl group (an example of the first bonding group) and the surface of the optical glass substrate 11 (see FIG. 2); the step B of preparing epoxidized silica fine particles 24, in which an alkoxysilane compound having an epoxy group (an example of the second film compound) is brought into contact with the surface of each silica fine particle 21 (an example of the transparent fine particle) to form a bond between an alkoxysilyl group (an example of the second bonding group) and the silica fine particle 21 (see FIG. 3); the step C of binding the epoxidized silica fine particles 24 to the surface of the epoxidized optical glass substrate 14 via bonds formed by coupling reactions, in which 2-methylimidazole is first brought into contact with the surface of the epoxidized optical glass substrate 14 to prepare a reactive optical glass substrate 32 as a result of a coupling reaction between an epoxy group and an amino group, and then each epoxidized silica fine particles 24 is brought into contact with the surface of the reactive optical glass substrate 32 to form a bond through a coupling reaction between an epoxy group and an imino group (an example of the second coupling reactive group), followed by removal of the epoxidized silica fine particles 24 that remains unfixed (see FIG. 4); the step D of preparing reactive silica fine particles 42 (an example of the second reactive transparent fine particles), in which a solution containing an epoxidized alkoxysilane compound (an example of the third film compound) is brought into contact with the surface of each silica fine particle 21 to form a bond between an alkoxysilyl group (an example of the third bonding group) and the surface of each silica fine particle 21, thereby preparing epoxidized silica fine particles 24 (an example of the second coated transparent fine particle), and then 2-methylimidazole (an example of the second coupling agent) is brought into contact with the surface of each epoxidized silica fine particle 24 to prepare the reactive silica fine particles 42 each having the surface coated with a film composed of 2-methylimidazole, the film being fixed via a bond formed by a coupling reaction between an epoxy group (an example of the third functional group) and an amino group (see FIG. 5); the step E of bringing the reactive silica fine particles 42 into contact with the surface of the antireflection film 1 having the transparent fine particle layer composed of the epoxidized silica fine particles 24 to form a bond through a coupling reaction between an epoxy group and an imino group, thereby binding and fixing the reactive silica fine particles 42 to the surface of the transparent fine particle layer composed of the epoxidized silica fine particles 24, followed by removal of the reactive silica fine particles 42 that remains unfixed; and the step F of bringing the epoxidized silica fine particles 24 into contact with the surface of the antireflection film 1 having the transparent fine particle layer composed of the reactive silica fine particles 42 to form a bond through a coupling reaction between an epoxy group and an imino group, thereby binding and fixing the epoxidized silica fine particles 24 to the surface of the transparent fine particle layer composed of the reactive silica fine particles 42, followed by removal of the epoxidized silica fine particles 24 that remains unfixed.

The steps A to F are described in detail below.

In the step A, an epoxidized optical glass substrate 14 having the surface coated with a monomolecular film 13 composed of a film compound having an epoxy group is prepared by bringing the film compound having an epoxy group into contact with an optical glass substrate 11 (FIG. 2).

The shape and size of the optical glass substrate 11 are not particularly limited. Specific examples of such an optical glass substrate include lenses for cameras, glasses, telescopes, microscopes, liquid-crystal projectors, or the like, glass sheets for CRT, LCD, organic EL, and other display systems, mirrors for reflecting telescopes or the like, and glass document stages for copying machines, flat head scanners, or the like.

Such a film compound having an epoxy group may be any compound as long as it can be adsorbed or bound to the surface of the optical glass substrate 11 and form a monomolecular film through self-organization, but preferably has a functional group containing an epoxy group (an oxirane ring) at one end of the linear alkylene group and an alkoxysilyl group (an example of the first bonding group) at the other end. This alkoxysilane compound is expressed by the following general formula (Chemical Formula 1)

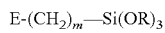

[Chemical Formula 1]

In this formula, the functional group E represents an epoxy-group-containing functional group, m represents an integer of 3 to 20, and R represents an alkyl group having one to four carbon atoms.

Specific examples of applicable alkoxysilane compounds having an epoxy group include the following alkoxysilane compounds (1) to (12):

(1) $(CH_2OCH)CH_2O(CH_2)_3Si(OCH_3)_3$
(2) $(CH_2OCH)CH_2O(CH_2)_7Si(OCH_3)_3$
(3) $(CH_2OCH)CH_2O(CH_2)_{11}Si(OCH_3)_3$
(4) $(CH_2CHOCH(CH_2)_2)CH(CH_2)_2Si(OCH_3)_3$
(5) $(CH_2CHOCH(CH_2)_2)CH(CH_2)_4Si(OCH_3)_3$
(6) $(CH_2CHOCH(CH_2)_2)CH(CH_2)_6Si(OCH_3)_3$
(7) $(CH_2OCH)CH_2O(CH_2)_3Si(OC_2H_5)_3$
(8) $(CH_2OCH)CH_2O(CH_2)_7Si(OC_2H_5)_3$
(9) $(CH_2OCH)CH_2O(CH_2)_{11}Si(OC_2H_5)_3$
(10) $(CH_2CHOCH(CH_2)_2)CH(CH_2)_2Si(OC_2H_5)_3$
(11) $(CH_2CHOCH(CH_2)_2)CH(CH_2)_4Si(OC_2H_5)_3$
(12) $(CH_2CHOCH(CH_2)_2)CH(CH_2)_6Si(OC_2H_5)_3$

In this list, the $(CH_2OCH)CH_2O$— group represents the functional group expressed by Chemical Formula 2 (glycidyloxy group), and the $(CH_2CHOCH(CH_2)_2)CH$— group represents the functional group expressed by Chemical Formula 3 (3,4-epoxycyclohexyl group)

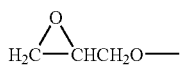

[Chemical Formula 2]

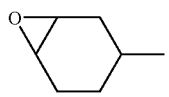

[Chemical Formula 3]

The epoxidized optical glass substrate 14 is manufactured by mixing an alkoxysilane compound having an epoxy group and an alkoxysilyl group (an example of the second bonding group), a condensation catalyst used to promote the condensation reaction between the alkoxysilyl group and a hydroxy group 12 of the surface of the optical glass substrate 11, and a non-aqueous organic solvent to obtain a reaction solution, applying this reaction solution to the surface of the optical glass substrate 11, and then allowing the reaction solution to react in the air at room temperature. The method used to apply the reaction solution may be the doctor blade method, dip coating, spin coating, spraying, screen printing, or any other method.

Examples of condensation catalysts that can be used in the present invention include metal salts, such as metal carboxylate salts, metal carboxylate esters, polymers based on a metal carboxylate salt, chelates based on a metal carboxylate salt, titanate esters, and chelates based on a titanate ester.

The amount of the condensation catalyst to be added is preferably in the range of 0.2 to 5 wt % of the alkoxysilane compound, and more preferably in the range of 0.5 to 1 wt %.

Specific examples of applicable metal carboxylate salts include tin (II) acetate, dibutyltin dilaurate, dibutyltin dioctate, dibutyltin diacetate, dioctyltin dilaurate, dioctyltin dioctate, dioctyltin diacetate, tin (II) dioctate, lead naphthenate, cobalt naphthenate, and iron 2-ethylhexenoate.

Specific examples of applicable metal carboxylate esters include dioctyltin bis-octylithio-glycolate and dioctyltin maleate.

Specific examples of applicable polymers based on a metal carboxylate salt include a polymer of dibutyltin maleate and a polymer of dimethyltin mercaptopropionate.

Specific examples of applicable chelates based on a metal carboxylate salt include dibutyltin bis-acetylacetate and dioctyltin bis-acetyllaurate.

Specific examples of applicable titanate esters include tetrabutyl titanate and tetranonyl titanate.

Specific examples of applicable chelates based on a titanate ester include bis(acetylacetonyl)dipropyl titanate.

The alkoxysilyl group and the hydroxy group 12 of the surface of the optical glass substrate 11 undergo a condensation reaction to form a monomolecular film 13 composed of a film compound having an epoxy group expressed by Chemical Formula 4 shown below. It should be noted that three single bonds extending from the oxygen atoms are bound to the silicon (Si) atom of the surface of the optical glass substrate 11 or the adjacent silane compound, and at least one of the three single bonds is bound to the silicon atom of the surface of the optical glass substrate 11.

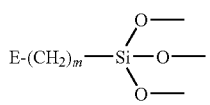

[Chemical Formula 4]

An alkoxysilyl group decomposes in the presence of water, and thus the relative humidity of the air in which the reaction thereof is performed is preferably 45% or lower. In addition, the condensation reaction is inhibited by oil or water adhering to the surface of the optical glass substrate 11, and thus it is preferable that the optical glass substrate 11 is well washed and dried to remove such impurities in advance.

The condensation reaction using any of the metal salts described above as the condensation catalyst would take approximately two hours to complete.

If one or more compounds selected from the group consisting of ketimine compounds, organic acids, aldimine compounds, enamine compounds, oxazolidine compounds, and aminoalkylalkoxysilane compounds are used as the condensation catalyst(s) instead of the metal salts described above, this reaction time can be shortened to approximately ½ to ⅔.

This reaction time can be further shortened by using any of these compounds as a promoter in combination with any of the metal salts described above (any weight ratio in the range of 1:9 to 9:1 is acceptable, but approximately 1:1 is preferable).

For example, provided that the other conditions are unchanged, the use of H3 manufactured by Japan Epoxy Resins Co., Ltd., a ketimine compound, as the condensation catalyst instead of dibutyltin oxide can shorten the time required to prepare the epoxidized silica fine particles 24 to approximately one hour without damaging of the product quality.

Furthermore, provided that the other conditions are unchanged, the use of the mixture of H3 manufactured by Japan Epoxy Resins Co., Ltd. and dibutyltin bis-acetylacetonate (the mixing ratio is 1:1) can shorten the time required to prepare the epoxidized silica fine particles 24 to approximately 20 minutes.

It should be noted that the kind of a ketimine compound used for this purpose is not particularly limited, and examples thereof include 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, and 2,4,20,22-tetramethyl-5,12,19-triaza-4,19-trieicosadiene.

Also, applicable organic acids are not particularly limited, and examples thereof include formic acid, acetic acid, propionic acid, lactic acid, and malonic acid.

Solvents used to prepare the reaction solution include organic chlorine solvents, hydrocarbon solvents, fluorocarbon solvents, silicone solvents, and mixtures of these solvents. To prevent hydrolysis of an alkoxysilane compound, it is preferable to add a desiccating agent to the solvent or distill the solvent to remove water contained therein. In addition, the boiling point of the solvent is preferably in the range of 50 to 250° C.

Specific examples of applicable solvents include non-aqueous petroleum naphtha, solvent naphtha, petroleum ether, petroleum benzine, isoparaffin, normal paraffin, decaline, industrial gasoline, nonane, decane, heating oil, dimethyl silicone, phenyl silicone, alkyl-modified silicone, polyether silicone, and dimethyl formamide.

In addition to these solvents, methanol, ethanol, propanol, and other alcohol solvents, as well as mixtures of them can be used.

Examples of applicable fluorocarbon solvents include chlorofluorocarbon solvents, Fluorinate (manufactured by 3M Company, US), and Aflude (manufactured by Asahi Glass Co., Ltd.). These solvents can be independently used or mixed with each other if the components can be mixed well with each other. Furthermore, dichloromethane, chloroform, or any other organic chlorine solvents can be added.

The concentration of the alkoxysilane compound in the reaction solution is preferably in the range of 0.5 to 3 wt %.

By washing the surface with solvent to remove the excess of the alkoxysilane compound and the condensation catalyst left on the surface as unreacted substances after the reaction, an epoxidized optical glass substrate 14 having the surface coated with the monomolecular film 13 composed of a film compound having an epoxy group is obtained. The cross-sectional structure of an epoxidized optical glass substrate 14 prepared in this way is schematically shown in FIG. 2B.

Any solvent can be used as washing solvent as long as it dissolves an alkoxysilane compound. Preferred examples thereof include dichloromethane, chloroform, and N-methylpyrrolidone, which are inexpensive, have high dissolving power, and can be easily removed by air-dry.

If the prepared epoxidized optical glass substrate 14 is left in the air without being washed with solvent after the reaction, the alkoxysilane compound left on the surface is partially hydrolyzed by water contained in the air and acquires a silanol group, and this silanol group is condensed with an alkoxysilyl group. As a result, the surface of the epoxidized optical glass substrate 14 is coated with an ultrathin polymer film composed of polysiloxane. This polymer film is not necessarily fixed to the surface of the epoxidized optical glass substrate 14 via covalent bonds, but it contains epoxy groups and thus its reactivity to the epoxidized optical glass substrate 14 is equivalent to that of the monomolecular film 13 composed of a film compound having an epoxy group. Therefore, omission of the washing step would have no significant influence on the step C and later manufacturing steps.

Although an alkoxysilane compound having an epoxy group is used in this embodiment, an alkoxysilane compound that has an amino group at one end of the linear alkylene group and an alkoxysilyl group at the other end may be used instead. This alkoxysilane compound is expressed by the following general formula (Chemical Formula 5).

A compound that has glycidyl groups at its both ends can be used as a coupling agent that reacts with the amino group.

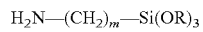
[Chemical Formula 5]

In this formula, m represents an integer of 3 to 20 and R represents an alkyl group having one to four carbon atoms.

Examples of applicable film compounds having an amino group include the following alkoxysilane compounds (21) to (28):
(21) $H_2N(CH_2)_3Si(OCH_3)_3$
(22) $H_2N(CH_2)_5Si(OCH_3)_3$
(23) $H_2N(CH_2)_7Si(OCH_3)_3$
(24) $H_2N(CH_2)_9Si(OCH_3)_3$
(25) $H_2N(CH_2)_5Si(OC_2H_5)_3$
(26) $H_2N(CH_2)_5Si(OC_2H_5)_3$
(27) $H_2N(CH_2)_7Si(OC_2H_5)_3$
(28) $H_2N(CH_2)_9Si(OC_2H_5)_3$ In this case, however, compounds containing a tin (Sn) salt cannot be used as the condensation catalyst for an alkoxysilane compound having an amino group because it reacts with the amino group and produces a precipitate.

Therefore, in the case where an alkoxysilane compound containing an amino group is used, the compounds used in the case where an alkoxysilane compound having an epoxy group is used, excluding tin carboxylate salts, tin carboxylate esters, polymers based on a tin carboxylate salt, and chelates based on a tin carboxylate salt, may be used independently or in combination of two or more.

The kinds and combinations of applicable promoters, the kinds of applicable solvents, and the concentrations of the alkoxysilane compound, the condensation catalyst, and the promoter, and the reaction conditions and times are the same as those used in the case where an alkoxysilane compound having an epoxy group is used, and thus are not further explained.

In this embodiment, an optical glass substrate used in various optical instruments is used as the substrate; however, materials like glass for front screens of automobiles, railroad cars, ships, or the like may also be used instead.

Also, transparent synthetic resins having a hydroxy group, an amino group, or any other active hydrogen group on the surface or other similar materials may also be used as the substrate.

(The Above is Related to the Step A)

In the step B, epoxidized silica fine particles 24 each having the surface coated with a monomolecular film 23 composed of a film compound having an epoxy group are prepared by bringing the film compound having an epoxy group, which is the same as that used in the step A, into contact with the silica fine particles 21 (FIG. 3).

The particle diameter of applicable silica fine particles 21 is appropriately chosen depending on the thickness, refractive index, porosity, and other parameters of the antireflection film to be produced. However, to prevent scattering of visible light, it should be smaller than visible wavelengths (380 to 700 nm).

More specifically, the diameter of the fine particles is preferably in the range of 10 to 400 nm, more preferably in the range of 10 to 300 nm, and much more preferably in the range of 10 to 100 nm.

The epoxidized silica fine particles 24 is produced by mixing an alkoxysilane compound having an epoxy group, a condensation catalyst used to accelerate the condensation reaction between the alkoxysilyl group and a hydroxy group 22 existing on the surface of each silica fine particle 21, and a non-aqueous organic solvent to obtain a reaction solution, dispersing the silica fine particles 21 in this reaction solution, and then allowing the reaction solution to react in the air at room temperature.

In the step B, the kinds and combinations of applicable alkoxysilane compounds having an epoxy group, condensation catalysts, promoters, the kinds of applicable solvents, and the concentrations of the alkoxysilane compound, the condensation catalyst, and the promoter, and the reaction conditions and times are the same as those used in the step A. Thus, these are not further explained.

By washing the surface with solvent to remove the excess of the alkoxysilane compound and the condensation catalyst left on the surface as unreacted substances after the reaction, epoxidized silica fine particles 24 each having the surface coated with a monomolecular film 23 composed of film compound having an epoxy group is obtained. The cross-sectional structure of one of epoxidized silica fine particles 24 prepared in this way is schematically shown in FIG. 3B.

As the washing solvent, the solvents used in the step A can be used.

If the prepared epoxidized silica fine particles 24 are left in the air without being washed with solvent after the reaction, the alkoxysilane compound left on the surface is partially hydrolyzed by water contained in the air and acquires a silanol group, and this silanol group is condensed with an alkoxysilyl group. As a result, the surface of each epoxidized silica fine particle 24 is coated with an ultrathin polymer film composed of polysiloxane. This polymer film is not completely fixed to the surface of the epoxidized silica fine particle 24 via covalent bonds, but it contains epoxy groups and thus its reactivity to the epoxidized silica fine particle 24 is equivalent to that of the monomolecular film 23 composed of a film compound having an epoxy group. Therefore, omission of the washing step would have no significant influence on the step C and later manufacturing steps.

Although an alkoxysilane compound having an epoxy group is used in this embodiment, an alkoxysilane compound that has an amino group at one end of the linear alkylene group and an alkoxysilyl group at the other end may be used instead, as described in the step A. Additionally, the alkoxysilane compounds used in the steps A and B may be the same, as described in this embodiment, or different from each other, as long as the alkoxysilane compound used in the step B has a functional group that forms a bond through a reaction with the coupling reactive group of the coupling agent used in the step C.

In this embodiment, silica fine particles are used as the transparent fine particles. However, any kind of fine particles may be used instead as long as they are transparent and have a surface functional group capable of forming a bond with the film compound. Examples of applicable transparent fine particles include inorganic fine particles such as alumina and zirconia fine particles, organic fine particles, organic-inorganic hybrid fine particles, or the like.

Any kind of fine particles other than silica fine particles may be used together with an alkoxysilane film compound as long as they each have a hydroxy group, an amino group, or any other active hydrogen group on the surface. Specific examples of such transparent fine particles include alumina and zirconia fine particles.

In this embodiment, both of the first and second film compounds are compounds having an epoxy group. However, the first and second film compounds may be the same as or different from each other. Furthermore, the first and second film compounds may have different functional groups (e.g., one has an epoxy group and the other has an isocyanate group).

(The Above is Related to the Step B)

In the step C, 2-methylimidazole is first brought into contact with the surface of the epoxidized optical glass substrate 14 to prepare a reactive optical glass substrate 32 as a result of a coupling reaction between an epoxy group and an amino group, and then the epoxidized silica fine particles 24 are brought into contact with the surface of the reactive optical glass substrate 32 to form a bond through a coupling reaction between an epoxy group and an imino group, thereby fixing the epoxidized silica particles to the surface of the epoxidized optical glass substrate 14, followed by removal of the epoxidized silica fine particles 24 that remain unfixed.

2-methylimidazole has an amino group and an imino group, both reactive with an epoxy group, at 1- and 3-positions, respectively, and forms bonds through the cross-linking reaction shown in Chemical Formula 6 below.

[Chemical Formula 6]

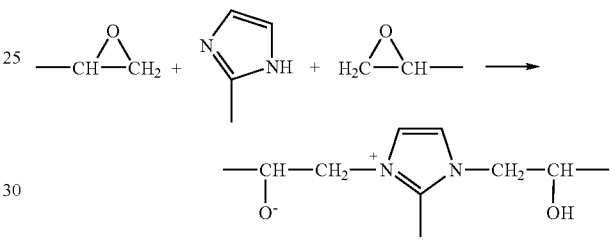

The reactive optical glass substrate 32 is prepared by mixing 2-methylimidazole and a solvent to obtain a reaction solution, applying this reaction solution to the surface of the epoxidized optical glass substrate 14, and then allowing for the reaction by heating. The method used to apply the reaction solution may be the doctor blade method, dip coating, spin coating, spraying, screen printing, or any other method.

Any solvent may be used to prepare a film precursor as long as 2-methylimidazole is soluble in it. However, isopropanol, ethanol, and other lower alcohol solvents are preferable because of their price, volatility at room temperature, toxicity, and other factors.

The amount of 2-methylimidazole to be added, the concentration of the solution to be applied, and the reaction temperature and time are appropriately selected depending on the kind of the used substrate and fine particles, the film thickness of the antireflection film to be produced, and other factors.

By washing the surface with solvent to remove the excess of 2-methylimidazole left on the surface as an unreacted substance after the reaction, a reactive optical glass substrate 32 having the surface coated with a reactive monomolecular film 31 is obtained (FIG. 4).

To the surface of this reactive optical glass substrate 32, a solution in which the epoxidized silica fine particles 24 are dispersed is applied. After that, a coupling reaction between the epoxy group existing on each epoxidized silica fine particle 24 and the imino group derived from 2-methylmidazole existing on the reactive monomolecular film 31 is initiated by heating to bind and fix the epoxidized silica fine particle 24 to the surface of the reactive optical glass substrate 32, thereby producing the antireflection film 1 having a transparent fine particle layer.

The heating temperature is preferably in the range of 100 to 200° C. A heating temperature lower than 100° C. would necessitate a long period of time to complete the coupling reaction, whereas a heating temperature higher than 200° C. would lead to decomposition reactions of the epoxy-group-containing monomolecular film 23 and the reactive monomolecular film 31, thereby causing the resulting antireflection film 1 to be nonuniform.

After the reaction, the excess of the epoxidized silica particles 24 is washed away using a solvent such as water or an alcohol.

Although 2-methylimidazole is used as the coupling agent in this embodiment, any imidazole derivative expressed by Chemical Formula 7 shown below may be used instead.

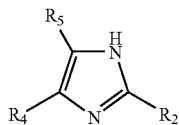

[Chemical Formula 7]

Specific examples of imidazole derivatives expressed by Chemical Formula 7 include the following compounds (31) to (38):
(31) 2-methylimidazole ($R_2$=Me, $R_4$=$R_5$=H)
(32) 2-undecylimidazole ($R_2$=$C_{11}H_{23}$, $R_4$=$R_5$=H)
(33) 2-pentadecylimidazole ($R_2$=$C_{15}H_{31}$, $R_4$=$R_5$=H)
(34) 2-methyl-4-ethylimidazole ($R_2$=Me, $R_4$=Et, $R_5$=H)
(35) 2-phenylimidazole ($R_2$=Ph, $R_4$=$R_5$=H)
(36) 2-phenyl-4-ethylimidazole ($R_2$=Ph, $R_4$=Et, $R_5$=H)
(37) 2-phenyl-4-methyl-5-hydroxymethylimidazole ($R_2$=Ph, $R_4$=Me, $R_5$=$CH_2OH$)
(38) 2-phenyl-4,5-bis(hydroxymethyl)imidazole ($R_2$=Ph, $R_4$=$R_5$=$CH_2OH$)

It should be noted that Me, Et, and Ph represent a methyl group, an ethyl group, and a phenyl group, respectively.

In addition to these compounds, an acid anhydride commonly used as a hardening agent for an epoxy resin, such as phthalic anhydride and maleic anhydride, dicyandiamide, novolac, or any other phenol derivative may be used as the coupling agent. In this case, an imidazole derivative may be used as a catalyst to accelerate the coupling reaction.

In addition, the case where a film compound containing an epoxy group as a functional group is used is described in this embodiment, but if a film compound having an amino group or an imino group as a functional group is used, a coupling agent containing two or more epoxy groups or two or more isocyanate groups as coupling reactive groups is used. Specific examples of compounds having isocyanate groups include p-phenylene diisocyanate, hexamethylene-1,6-diisocyanate, toluene-2,6-diisocyanate, and toluene-2,4-diisocyanate.

As with the case of 2-methylimidazole, the amount of such a diisocyanate compound to be added is preferably in the range of 5 to 15 wt % of epoxidized silica fine particles. Examples of solvents that can be used in this case to prepare a film precursor include aromatic organic solvents, such as xylene.

Also, in the case where a film compound having an amino group is used, a compound having two or more epoxy groups, such as ethylene glycol diglycidyl ether, can be used as the cross-linking agent.

(The Above is Related to the Step C)

In the step D, a solution containing an epoxidized alkoxysilane compound is brought into contact with the surface of the silica fine particles 21 to form a bond between an alkoxysilyl group and the surface of each silica fine particle 21, thereby preparing epoxidized silica fine particles 24, and then 2-methylimidazole is brought into contact with the surface of each epoxidized silica fine particle 24 to prepare reactive silica fine particles 42 each having the surface coated with a film composed of 2-methylimidazole, the film being fixed via a bond formed by a coupling reaction between an epoxy group and the amino group derived from 2-methylimidazole (FIG. 5).

The concentration of the 2-methylimidazole solution used, reaction conditions, and other factors are the same as those used in the step C to prepare the reactive optical glass substrate 32, except that the solution is not applied but used to disperse the epoxidized silica fine particles 24 and then heated, and thus are not further explained. Applicable coupling agents other than 2-methylimidazole are also the same as those mentioned in the step C for preparation of the reactive optical glass substrate 32.

In this embodiment, the third film compound is a compound having an epoxy group. However, it may be the same as or different from the first and second film compounds. Furthermore, it may have a functional group different from those of the first and second film compounds (e.g., an amino group).

(The Above is Related to the Step D)

In the step E, the reactive silica fine particles 42 are brought into contact with the surface of the antireflection film 1 having a transparent fine particle layer composed of the epoxidized silica fine particles 24 to form a bond through a coupling reaction between an epoxy group and an imino group, thereby binding and fixing the reactive silica fine particles 42 to the surface of the transparent fine particle layer composed of the epoxidized silica fine particles 24, followed by removal of the reactive silica fine particles 42 that remain unfixed.

In the step F, the epoxidized silica fine particles 24 are brought into contact with the surface of the antireflection film 1 having a transparent fine particle layer composed of the reactive silica fine particles 42 to form a bond through a coupling reaction between an epoxy group and an imino group, thereby binding and fixing the epoxidized silica fine particles 24 to the surface of the transparent fine particle layer composed of the reactive silica fine particles 42, followed by removal of the epoxidized silica fine particles 24 that remain unfixed.

The reaction conditions used in the steps E and F are the same as those used in the step D, and thus are not further explained.

(The Above is Related to the Steps E and F)

In this embodiment, steps for preparing an antireflection film having two transparent fine particle layers were described. However, the step G of producing an antireflection film containing n layers (n is an integer equal to or greater than 2) of the transparent fine particle layers by repeating the steps E and F in this order may be added. It should be noted that, in the step G, the final step may be the step E or F depending on the value of n.

Next, an antireflection film 2 according to the second embodiment of the present invention is described.

As shown in FIG. 1B, the antireflection film 2 is configured as follows: a transparent fine particle layer formed of arranged reactive silica fine particles 42 (an example of the first reactive transparent fine particles) is bound and fixed to the surface of an epoxidized optical glass substrate 14; and the first to n-th layers of the transparent fine particle layers (n represents an integer equal to or greater than 2, and is 2 in this embodiment) are sequentially layered in the direction from the surface of the epoxidized optical glass substrate 14 toward the air interface.

The surface of the epoxidized optical glass substrate 14 is coated with a monomolecular film 13 composed of a film compound having an epoxy group.

The surface of each epoxidized silica fine particle 24 forming the first transparent fine particle layer is coated with a film composed of 2-methylimidazole, which is fixed via a bond formed by a coupling reaction between the amino group of 2-methylimidazole and an epoxy group.

The epoxidized glass substrate 14 and the reactive silica fine particles 42 forming the first transparent fine particle layer are bound and fixed to each other via bonds formed by coupling reactions between an epoxy group and an amino or imino group of 2-methylimidazole. The reactive silica fine particles 42 forming an odd-numbered transparent fine particle layer and the epoxidized silica fine particles 24 forming an even-numbered transparent fine particle layer are also bound and fixed to each other in the same manner.

As shown in FIGS. 2A, 2B, 3A, 3B, and 5, a method for manufacturing the antireflection film 2 includes the step A of preparing an epoxidized optical glass substrate 14, in which a solution containing an alkoxysilane compound having an epoxy group is brought into contact with the surface of an optical glass substrate 11 to form a bond between an alkoxysilyl group and the surface of the optical glass substrate 11; the step B of preparing epoxidized silica fine particles 24, in which an alkoxysilane compound having an epoxy group is brought into contact with the surface of each silica fine particle 21 to form a bond between an alkoxysilyl group and the silica fine particle 21; the step C of binding reactive silica fine particles 42 to the surface of the epoxidized optical glass substrate 14 via bonds formed by coupling reactions, in which 2-methylimidazole is first brought into contact with the surface of each epoxidized silica fine particle 24 to prepare a reactive optical glass substrate 32 as a result of a coupling reaction between an epoxy group and an amino group, and then the reactive silica fine particle 42 are brought into contact with the surface of the reactive optical glass substrate 32 to form a bond through a coupling reaction between an epoxy group and an imino group (an example of the second coupling reactive group), followed by removal of the reactive silica fine particles 42 that remain unfixed; the step D of preparing epoxidized silica fine particles 24, in which a solution containing an epoxidized alkoxysilane compound is brought into contact with the surface of each silica fine particle 21 to form a bond between an alkoxysilyl group and the surface of each silica fine particle 21; the step E of bringing the epoxidized silica fine particles 24 into contact with the surface of the antireflection film 1 having a transparent fine particle layer composed of the reactive silica fine particles 42 to form a bond through a coupling reaction between an epoxy group and an imino group, thereby binding and fixing the reactive epoxidized silica fine particles 24 to the surface of the transparent fine particle layer composed of the reactive silica fine particles 42, followed by removal of an unfixed portion of the epoxidized silica fine particles 24; and the step F of bringing the reactive silica fine particles 42 into contact with the surface of the antireflection film 1 having a transparent fine particle layer composed of the epoxidized silica fine particles 24 to form a bond through a coupling reaction between an epoxy group and an imino group, thereby binding and fixing the reactive silica fine particles 42 to the surface of the transparent fine particle layer composed of the epoxidized silica fine particles 24, followed by removal of an unfixed portion of the reactive silica fine particles 42.

In the steps A to F, methods for preparing the epoxidized optical glass substrate 14, epoxidized silica fine particles 24, reactive optical glass substrate 32, and reactive silica fine particles 42, and the reactions involving these components are the same as those described with respect to the antireflection film 1 according to the first embodiment. Therefore, these are not further explained.

EXAMPLES

Examples made to confirm the advantageous effect of the present invention are described below.

Example 1

Preparation of an Epoxidized Optical Glass Substrate

An optical glass substrate was prepared, and then well washed and dried.

Separately, 0.99 parts by weight of 3-glycidyloxypropyltrimethoxysilane (Chemical Formula 8; manufactured by Shin-Etsu Chemical Co., Ltd.) and 0.01 parts by weight of dibutyltin bis-acetylacetonate (a condensation catalyst) were weighed and then dissolved in 100 parts by weight of hexadimethyldisiloxane solvent to prepare a reaction solution.

[Chemical Formula 8]

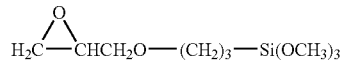

This reaction solution was applied to the optical glass substrate and allowed to react in the air (relative humidity: 45%) for approximately two hours.

After that, the glass substrate was washed with chloroform to remove the excess of the alkoxysilane compound and dibutyltin bis-acetylacetonate.

Example 2

Preparation of Epoxidized Silica Fine Particles

Silica fine particles containing no water and having a particle diameter of approximately 100 nm were prepared and well dried.

0.99 parts by weight of 3-glycidyloxypropyltrimethoxysilane (Chemical Formula 8) and 0.01 parts by weight of dibutyltin bis-acetylacetonate (a condensation catalyst) were weighed and then dissolved in 100 parts by weight of hexadimethyldisiloxane solvent to prepare a reaction solution.

To this reaction solution, silica fine particles were added. The mixture was stirred and allowed to react in the air (relative humidity: 45%) for approximately two hours.

After that, the silica fine particles were washed with trichloroethylene to remove the excess of the alkoxysilane compound and dibutyltin bis-acetylacetonate.

Example 3

Preparation of a Reactive Optical Glass Substrate

Ethanol solution of 2-methylimidazole was applied to the surface of the epoxidized optical glass substrate prepared in Example 1 and then the glass substrate was heated at 100° C. After the reaction between epoxy groups and the amino group of 2-methylimidazole, a reactive optical glass substrate was obtained. This reactive optical glass substrate was washed with ethanol to remove the excess of 2-methylimidazole.

Example 4

Preparation of Reactive Silica Fine Particles

The epoxidized silica fine particles prepared in Example 2 were dispersed in ethanol solution of 2-methylimidazole and the solution was heated at 100° C. After the reaction between epoxy groups and the amino group of 2-methylimidazole, a reactive optical glass substrate was obtained. It was washed with ethanol to remove the excess of 2-methylimidazole.

Example 5

Preparation of an Antireflection Film (1)

To the surface of the reactive optical glass substrate obtained in Example 3, a solution prepared by dispersing the epoxidized silica fine particles obtained in Example 2 in ethanol was applied, and then the glass substrate was heated at 100° C. After the reaction, the glass substrate was washed with water to remove the excess of the epoxidized silica fine particles, and thus a monolayer antireflection film containing a fine particle layer was obtained. The transparent fine particle layer of this monolayer antireflection film had a thickness of approximately 100 nm and was highly uniform, and thus exhibited no interference color.

To the surface of this monolayer antireflection film containing a transparent fine particle layer, a solution prepared by dispersing the reactive silica fine particles obtained in Example 4 in ethanol was applied, and then the antireflection film was heated at 100° C. After the reaction, the antireflection film was washed with water to remove the excess of the reactive silica fine particles, and thus a layered antireflection film containing two transparent fine particle layers was obtained.

Example 6

Preparation of an Antireflection Film (2)

To the surface of the epoxidized optical glass substrate obtained in Example 1, solution prepared by dispersing the reactive silica fine particles obtained in Example 4 in ethanol was applied, and then the glass substrate was heated at 100° C. After the reaction, the glass substrate was washed with water to remove the excess of the reactive silica fine particles.

To the surface of this monolayer antireflection film containing a transparent fine particle layer, a solution prepared by dispersing the epoxidized silica fine particles obtained in Example 2 in ethanol was applied, and then the antireflection film was heated at 100° C. After the reaction, the antireflection film was washed with water to remove the excess of the epoxidized silica fine particles, and thus a bilayer antireflection film containing two transparent fine particle layers was obtained.

This bilayer antireflection film had a thickness of the transparent fine particle layers of approximately 200 nm and was highly uniform, and thus exhibited no interference color.

Example 7

Preparation of an Antireflection Film (3)

0.99 parts by weight of 3-aminopropyltrimethoxysilane (Chemical Formula 9; manufactured by Shin-Etsu Chemical Co., Ltd.) and 0.01 parts by weight of acetic acid (a condensation catalyst) were weighed and then dissolved in 100 parts by weight of hexamethyldisiloxane-dimethylformamide mixed solvent (1:1 (v/v)) to prepare a reaction solution. This reaction solution was used to carry out the same processes described in Examples 1 and 2 to prepare an aminated optical glass substrate and aminated silica fine particles having a particle diameter of approximately 100 nm.

Then, p-phenylene diisocyanate was used as a coupling agent to carry out the same processes described in Examples 3 and 4 to prepare a reactive optical glass substrate and reactive silica fine particles both having an isocyanate group as a coupling reactive group.

Using these raw materials, the same processes described in Examples 5 and 6 were carried out. As a result, layered antireflection films containing one or two transparent fine particle layers were obtained.

The transparent fine particle layer of the bilayer antireflection film had a thickness of approximately 200 nm and was highly uniform, and thus exhibited no interference color.

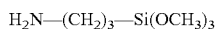

$H_2N-(CH_2)_3-Si(OCH_3)_3$ [Chemical Formula 9]

The invention claimed is:

1. An antireflection film, comprising a substrate coated with a film composed of a first film compound having a first functional group and a transparent fine particle layer formed of arranged transparent fine particles each coated with a film composed of a second film compound having a second functional group and bound and fixed to a surface of the substrate, wherein:

the coated transparent fine particle is fixed to the coated substrate via bond formed by coupling reactions between the first functional group and a coupling agent and between the second functional group and the coupling agent, and the coupling agent has at least one first coupling reactive group that forms a bond through a coupling reaction with the first functional group and at least one second coupling reactive group that forms a bond through a coupling reaction with the second functional group, and each of the bonds formed by the coupling reactions is an N—CH$_2$CH(OH) bond formed by a reaction between an amino or imino group and an epoxy group, or an NH—CONH bond formed by a reaction between an amino or imino group and an isocyanate group.

2. The antireflection film according to claim 1, wherein the first film compound and the second film compound are the same compound.

3. The antireflection film according to claim 1, wherein the film composed of the first film compound and/or the film composed of the second film compound is a monomolecular film.

4. An antireflection film, comprising a substrate coated with a film composed of a first film compound having a first functional group and a plurality of transparent fine particle layers each formed of arranged transparent fine particles, wherein:

the transparent fine particle layers are sequentially layered in order on a surface of the substrate from the first layer to the n-th layer (n represents an integer equal to or greater than 2) in a direction from the coated substrate side toward an air interface side; the surface of the transparent fine particle forming the x-th transparent fine particle layer (x is an integer; $1 \leq m \leq n$) is coated with a film composed of an m-th film compound having an (x+1)-th functional group; and the (x−1)-th and x-th transparent fine particle layers are fixed to each other via bonds formed by: a coupling reaction between a x-th functional group and a x-th coupling reactive group of an x-th coupling agent having at least one x-th coupling reactive group that forms a bond through a coupling reaction with the x-th functional group and at least one (x+1)-th coupling reactive group that forms a bond through a coupling reaction with the (x+1)-th functional group; and a coupling reaction between the (x+1)-th functional group and the (x+1)-th coupling reactive group.

5. The antireflection film according to claim 4, wherein the first to (n+1)-th film compounds are the same compound and the first to n-th coupling agents are the same compound.

6. The antireflection film according to claim 4, wherein the films respectively composed of the first to (n+1)-th film compounds are all monomolecular films.

7. The antireflection film according to claim 1, wherein each of the bonds formed by the coupling reactions is an N—$CH_2CH(OH)$ bond formed by a reaction between an amino or imino group and an epoxy group.

8. The antireflection film according to claim 1, wherein each of the bonds formed by the coupling reactions is an NH—CONH bond formed by a reaction between an amino or imino group and an isocyanate group.

9. A method for manufacturing an antireflection film comprising a substrate coated with a film composed of a first film compound having a first functional group and a first bonding group at each end thereof, and a transparent fine particle layer formed as an array of transparent fine particles each coated with a film composed of a second film compound having a second functional group and a second bonding group at each end thereof and bound and fixed to a surface of the substrate, comprising:
a step A of bringing a solution comprising the first film compound into contact with the surface of the substrate to form a bond between the first bonding group and the surface of the substrate to thereby prepare a coated substrate having a surface coated with a film composed of the first film compound;
a step B of bringing a solution comprising the second film compound into contact with the surface of the transparent fine particle to form a bond between the second bonding group and the surface of the first transparent fine particle to thereby prepare a first coated transparent fine particle having a surface coated with a film composed of the second film compound; and
a step C of bringing a first coupling agent having at least one first coupling reactive group that forms a bond through a coupling reaction with the first functional group and at least one second coupling reactive group that forms a bond through a coupling reaction with the second functional group into contact with the surface of the coated substrate and the surface of the first coated transparent fine particle to form bonds through coupling reactions between the first functional group and the first coupling reactive group and between the second functional group and the second coupling reactive group to thereby bind and fix one transparent fine particle layer composed of the first coated transparent fine particles to the surface of the coated substrate, followed by removing the first coated transparent fine particles that remain unfixed,
wherein each of the bonds formed by the coupling reactions is an N—$CH_2CH(OH)$ bond formed by a reaction between an amino or imino group and an epoxy group, or an NH—CONH bond formed by a reaction between an amino or imino group and an isocyanate group.

10. The method for manufacturing an antireflection film according to claim 9, wherein, in the step C, the first coupling agent is first brought into contact with the surface of the coated substrate to prepare a reactive substrate coated with a film composed of the first coupling agent, and then the first coated transparent fine particle is brought into contact with and fixed to the surface of the reactive substrate.

11. The method for manufacturing an antireflection film according to claim 9, wherein, in the step C, the first coupling agent is first brought into contact with the surface of the first coated transparent fine particle to prepare a first reactive transparent fine particle coated with a film composed of the first coupling agent, and then the surface of the first reactive transparent fine particle is brought into contact with and fixed to the surface of the coated substrate.

12. The method for manufacturing an antireflection film according to claim 9, wherein the first film compound and the second film compound are the same compound.

13. The method for manufacturing an antireflection film according to claim 9, wherein, in the steps A and B, the first and second film compounds that remain unreacted are washed away, and the film formed of the first film compound on the surface of the coated substrate and the film formed of the second film compound on the surface of the first coated transparent fine particle are monomolecular films.

14. The method for manufacturing an antireflection film according to claim 10 having a plurality of transparent fine particle layers which are sequentially layered in order on the substrate from the first layer to the n-th layer (n represents an integer equal to or greater than 2) in a direction from the substrate side toward an air interface side, further comprising:
a step D of bringing a solution comprising a third film compound having a third functional group and a third bonding group at each end thereof into contact with the surface of the transparent fine particle to form a bond between the third bonding group and the surface of the transparent fine particle and thereby to coat the second coated transparent fine particle with a film composed of the third film compound, and then bringing a second coupling agent having the second coupling reactive group and at least one third coupling reactive group that forms a bond through a coupling reaction with the third functional group into contact with the surface of the second coated transparent fine particle to prepare the second reactive transparent fine particle having the surface thereof coated with a film composed of the second coupling agent that is fixed to the second coated transparent fine particle via a bond formed by a coupling reaction between the third functional group and the third coupling reactive group;
a step E of bringing the second reactive transparent fine particle into contact with the surface of the transparent fine particle layer composed of the first coated transparent fine particles to form a bond through a coupling reaction between the second functional group and the second coupling reactive group, thereby to bind and fix the second reactive transparent fine particle to the surface of the transparent fine particle layer composed of the first coated transparent fine particles, followed by removing the second reactive transparent fine particles that remain unfixed;
a step F of bringing the first coated transparent fine particle into contact with the surface of the transparent fine particle layer composed of the second reactive transparent fine particles to form a bond through a coupling reaction between the second functional group and the second coupling reactive group, thereby to bind and fix the first coated transparent fine particle to the transparent fine particle layer composed of the second reactive transparent fine particles, followed by removing the first coated transparent fine particles that remain unfixed; and a step G of repeating the steps E and F in this order to produce an antireflection film comprising n transparent fine particle layers.

15. The method for manufacturing an antireflection film according to claim 11 having a plurality of transparent fine particle layers which are sequentially layered in order on the substrate from the first layer to the n-th layer (n represents an integer equal to or greater than 2) in a direction from the substrate side toward an air interface side, further comprising:

a step D of bringing a solution comprising the third film compound into contact with the surface of the transparent fine particle to form a bond between the third bonding group and the surface of the transparent fine particle, to thereby prepare a second coated transparent fine particle that is the transparent fine particle the surface of which is coated with a film composed of the third film compound;

a step E of bringing the second coated transparent fine particle into contact with the surface of the transparent fine particle layer composed of the first reactive transparent fine particles to form a bond through a coupling reaction between the third functional group and the first coupling reactive group, to thereby bind and fix the second coated transparent fine particle to the transparent fine particle layer composed of the first reactive transparent fine particles, followed by removing the second coated transparent fine particles that remain unfixed;

a step F of bringing the first reactive transparent fine particle into contact with the surface of the transparent fine particle layer composed of the second coated transparent fine particles to form a bond through a coupling reaction between the third functional group and the first coupling reactive group, to thereby bind and fix the first reactive transparent fine particle to the transparent fine particle layer composed of the second coated transparent fine particles, followed by removing the first reactive transparent fine particles that remain unfixed; and a step G of repeating the step E and F in this order to produce an antireflection film comprising n transparent fine particle layers.

16. The method for manufacturing an antireflection film according to claim 14, wherein the first to third film compounds are the same compound.

17. The method for manufacturing an antireflection film according to claim 14, wherein, in the step D, the third film compound that remains unreacted is washed away and the film formed of the third film compound on the surface of the second coated transparent fine particle is a monomolecular film.

18. The method for manufacturing an antireflection film according to claim 9, wherein the first and second film compounds are all alkoxysilane compounds and each of the solutions respectively comprising the first and second film compounds further comprise at least one compound selected from the group consisting of metal carboxylate salts, metal carboxylate esters, polymers based on a metal carboxylate salt, chelates based on a metal carboxylate salt, titanate esters, and chelates based on a titanate ester.

19. The method for manufacturing an antireflection film according to claim 9, wherein the first and second film compounds are all alkoxysilane compounds and each of the solutions respectively comprising the first and second film compounds further comprise at least one compound selected from the group consisting of ketimine compounds, organic acids, aldimine compounds, enamine compounds, oxazolidine compounds, and aminoalkylalkoxysilane compounds.

20. The method for manufacturing an antireflection film according to claim 14, wherein the first to third film compounds are all alkoxysilane compounds and each of the solutions respectively comprising the first, second, and third film compounds further comprise at least one compound selected from the group consisting of metal carboxylate salts, metal carboxylate esters, polymers based on a metal carboxylate salt, chelates based on a metal carboxylate salt, titanate esters, and chelates based on a titanate ester.

21. The method for manufacturing an antireflection film according to claim 14, wherein the first to third film compounds are all alkoxysilane compounds and each of the solutions respectively comprising the first, second, and third film compounds further comprise at least one compound selected from the group consisting of ketimine compounds, organic acids, aldimine compounds, enamine compounds, oxazolidine compounds, and aminoalkylalkoxysilane compounds.

22. The method for manufacturing an antireflection film according to claim 9, wherein the bonds formed by the coupling reactions is an N—$CH_2$CH(OH) bond formed by a reaction between an amino or imino group and an epoxy group.

23. The method for manufacturing an antireflection film according to claim 9, wherein the bonds formed by the coupling reactions is an NH—CONH bond formed by a reaction between an amino or imino group and an isocyanate group.

* * * * *

UNITED STATES PATENT AND TRADEMARK OFFICE
CERTIFICATE OF CORRECTION

| | | |
|---|---|---|
| PATENT NO. | : 8,475,916 B2 | Page 1 of 1 |
| APPLICATION NO. | : 12/597743 | |
| DATED | : July 2, 2013 | |
| INVENTOR(S) | : Ogawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this
Twenty-seventh Day of January, 2015

Michelle K. Lee
*Deputy Director of the United States Patent and Trademark Office*